(12) United States Patent
Anderson et al.

(10) Patent No.: US 11,325,047 B2
(45) Date of Patent: May 10, 2022

(54) APPARATUS, SYSTEM AND METHOD OF AUTHENTICATION

(71) Applicant: Sony Interactive Entertainment Inc., Tokyo (JP)

(72) Inventors: Mark Anderson, London (GB); Mohammad Mansoor Nusrat, London (GB); Sashikanth Reddy Dareddy, London (GB); Andrew John Nicholas Jones, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 122 days.

(21) Appl. No.: 16/783,413

(22) Filed: Feb. 6, 2020

(65) Prior Publication Data

US 2020/0261803 A1 Aug. 20, 2020

(30) Foreign Application Priority Data

Feb. 19, 2019 (GB) ...................................... 1902250

(51) Int. Cl.
*A63F 13/79* (2014.01)
*A63F 13/24* (2014.01)
(Continued)

(52) U.S. Cl.
CPC .............. *A63F 13/79* (2014.09); *A63F 13/24* (2014.09); *A63F 13/285* (2014.09);
(Continued)

(58) Field of Classification Search
CPC ........ A63F 13/79; A63F 13/24; A63F 13/285; A63F 13/428; A63F 13/71; A63F 13/73; A63F 13/92
See application file for complete search history.

(56) References Cited

U.S. PATENT DOCUMENTS

| 2010/0248822 A1* | 9/2010 | Migos ..................... G06F 21/83 |
| | | 463/29 |
| 2011/0043475 A1 | 2/2011 | Rigazio |

(Continued)

OTHER PUBLICATIONS

Combined Search and Examination Report for corresponding GB Application No. GB1902250.8, 9 pages, dated Jul. 23, 2019.
(Continued)

*Primary Examiner* — Yingchuan Zhang
(74) *Attorney, Agent, or Firm* — Matthew B. Dernier, Esq.

(57) ABSTRACT

A system for identifying a user of a controller includes a controller having one or more sensors configured to detect interaction with the controller by the user and a transmitter configured to transmit telemetry data based on outputs of one or more of the sensors, a user profile unit configured to obtain user profile data for one or more user profiles, where each user profile corresponds to a respective user and the user profile data for a user profile comprises data indicative of one or more characteristic interactions by the user with the controller, and a user profile selection unit configured to select a user profile from the one or more user profiles in dependence upon a degree of match between one or more properties of the transmitted telemetry data and the data of each respective user profile, and configured to modify an output of the system responsive to the selection.

14 Claims, 7 Drawing Sheets

(51) Int. Cl.
    *A63F 13/285*      (2014.01)
    *A63F 13/428*      (2014.01)
    *A63F 13/71*      (2014.01)
    *A63F 13/73*      (2014.01)
    *A63F 13/92*      (2014.01)

(52) U.S. Cl.
    CPC ............ *A63F 13/428* (2014.09); *A63F 13/71* (2014.09); *A63F 13/73* (2014.09); *A63F 13/92* (2014.09); *A63F 2300/105* (2013.01); *A63F 2300/1037* (2013.01); *A63F 2300/5546* (2013.01)

(56) References Cited

U.S. PATENT DOCUMENTS

| | | |
|---|---|---|
| 2011/0118026 A1 | 5/2011 | Lukas |
| 2016/0039429 A1 | 2/2016 | Abou-Nasr |
| 2016/0375364 A1 | 12/2016 | Mikhailov |
| 2018/0101232 A1* | 4/2018 | Levesque ................. G08B 6/00 |
| 2019/0012452 A1* | 1/2019 | Asnis ..................... G06F 3/017 |

OTHER PUBLICATIONS

Extended European Search Report for corresponding EP Application No. 20151249.8, 8 pages, dated May 18, 2020.

* cited by examiner

| User profile | Confidence Score |
|---|---|
| User A | 0.95 |
| User B | 0.10 |
| User C | 0.12 |
| User D | 0.08 |

Fig. 7

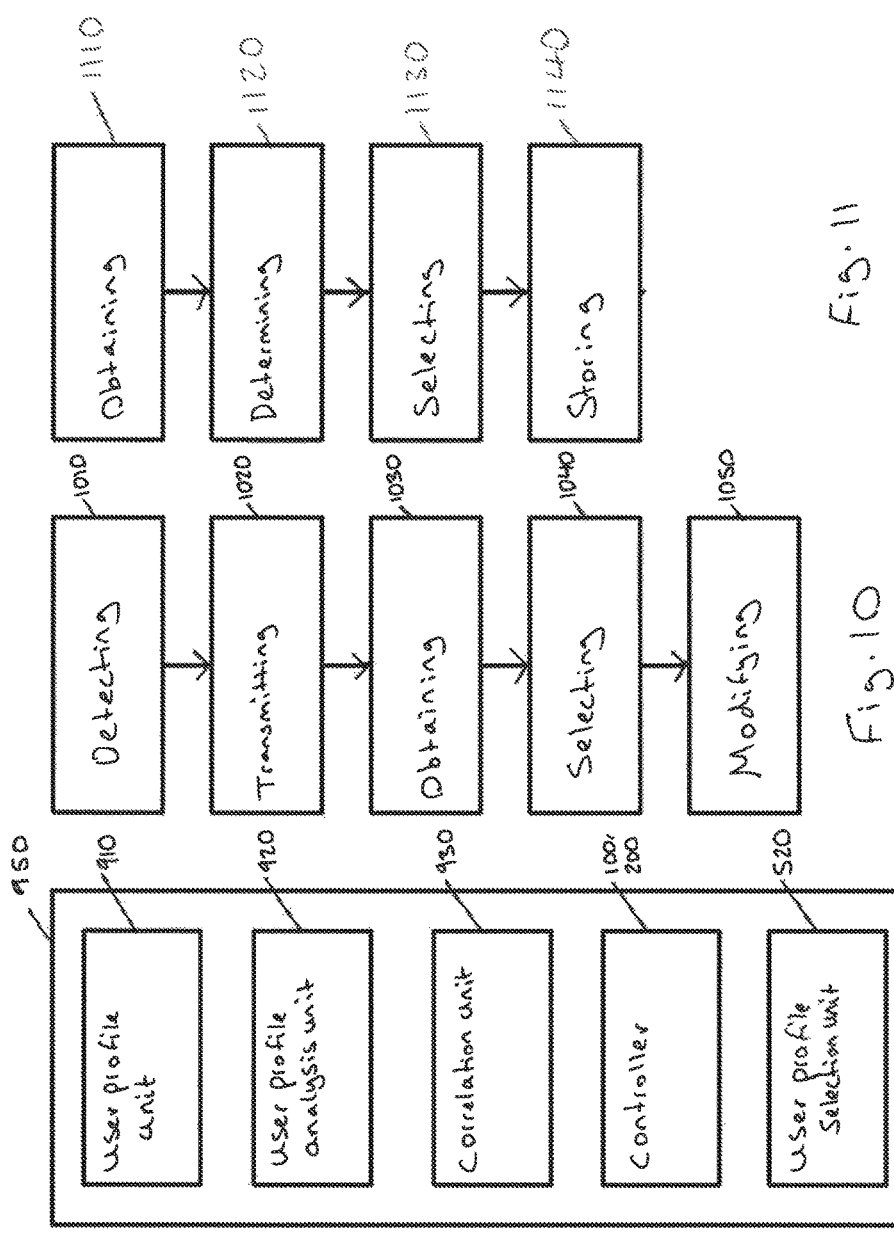
Fig. 11
Fig. 10
Fig. 9b
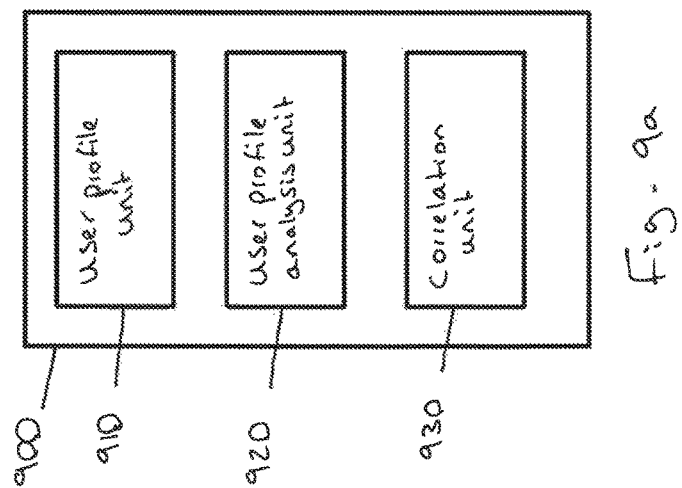
Fig. 9a

APPARATUS, SYSTEM AND METHOD OF AUTHENTICATION

BACKGROUND OF THE INVENTION

Field of the Invention

The present disclosure relates to an input device and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As internet connectivity for games consoles has become more widespread, it has become increasingly common for users to be able to login to the same user account as they use on their own console when playing on a different console. This is desirable, as a user may be able to track their in-game progress or access their account-specific content even when playing at a friend's house.

However, to log in to their account a user is often required to enter a password which may be seen by other users. Moreover, once a user has entered their password, a situation arises where the user remains logged into their account unless the user subsequently performs a log out operation, which can result in other user's potentially obtaining access to the user's profile. Similarly, in some situations different users may share use of a single controller when playing at a friend's house and one user's achievements may be attributed to an account of another user who is already logged in.

The presently disclosed arrangement seeks to mitigate this problem by providing a method and an apparatus for determining an identity of a user holding a handheld controller.

SUMMARY OF THE INVENTION

Various aspects and features of the present invention are defined in the appended claims and within the text of the accompanying description and include at least an apparatus, system and a method, as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 schematically illustrates an example of confidence scores for respective user profiles;

FIG. 9a schematically illustrates an apparatus to store a model trained to define a relationship between each user of a plurality of users and one or more properties of data indicative of characteristic interactions by each user with a controller;

FIG. 9b schematically illustrates a system comprising the user profile unit, the user profile analysis unit, the correlation unit, the controller and the user profile selection unit;

FIG. 10 schematically illustrates a flowchart in respect of a method of identifying a user of a controller; and FIG. 11 schematically illustrates a flowchart in respect of a method of storing a model trained to define a relationship between each user of a plurality of users and one or more properties of data indicative of characteristic interactions by each user with a controller.

DESCRIPTION OF THE EMBODIMENTS

Figure 1:
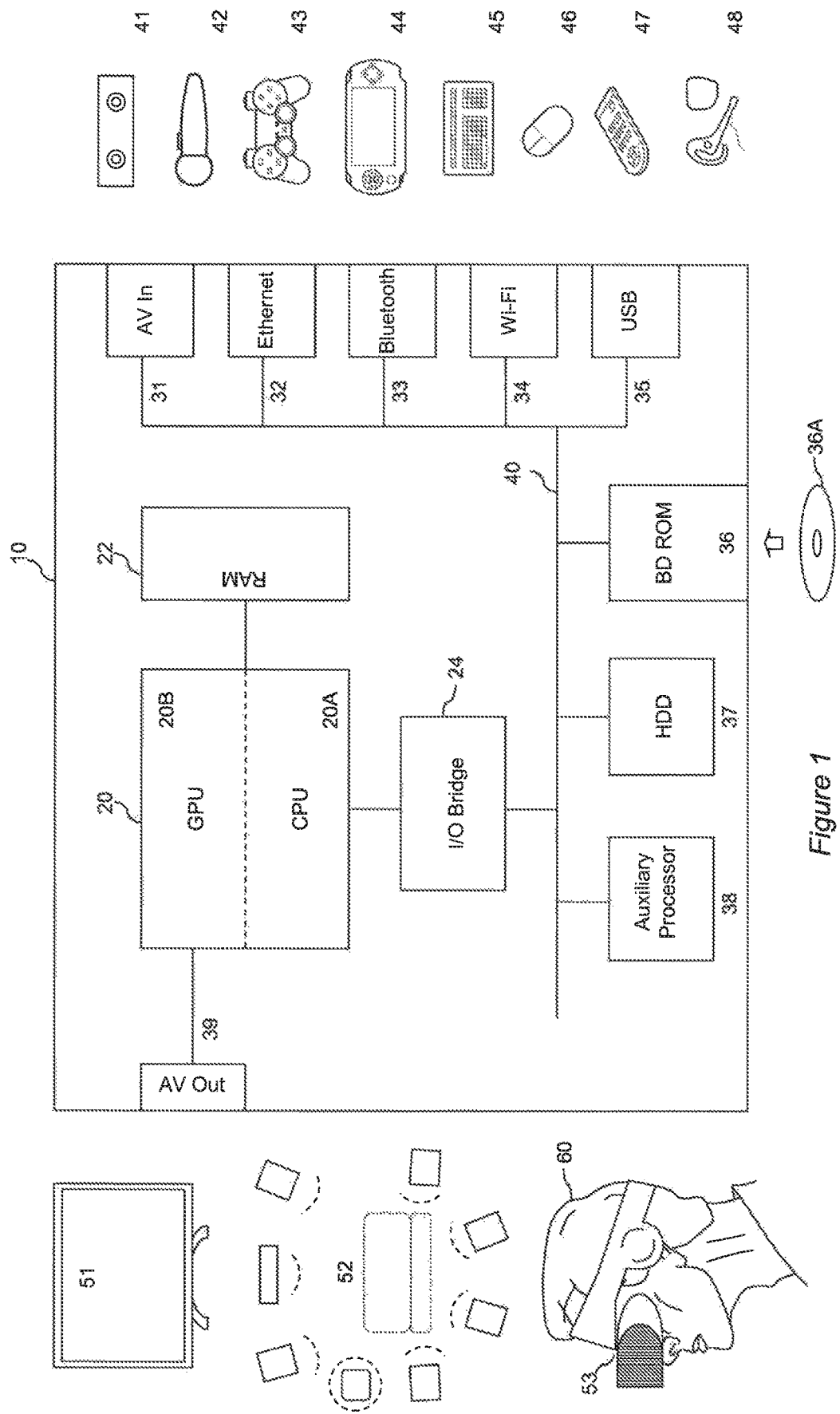
FIG. 1 schematically illustrates a computer game processing apparatus.

For clarity of illustration, elements illustrated in the figures have not necessarily been drawn to scale. Further, where considered appropriate, reference numerals have been repeated among the figures to indicate corresponding or analogous elements.

The terms "coupled" and "connected," along with their derivatives, may be used herein to describe structural relationships between components of the system for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit 10.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a computer game processing apparatus in communication with a controller 42, 43 via a wired or wireless communication link (such as a Bluetooth® link), where the computer game processing apparatus is configured to execute an executable program associated with a computer game in accordance with data obtained from the controller 42, 43.

Figure 2:
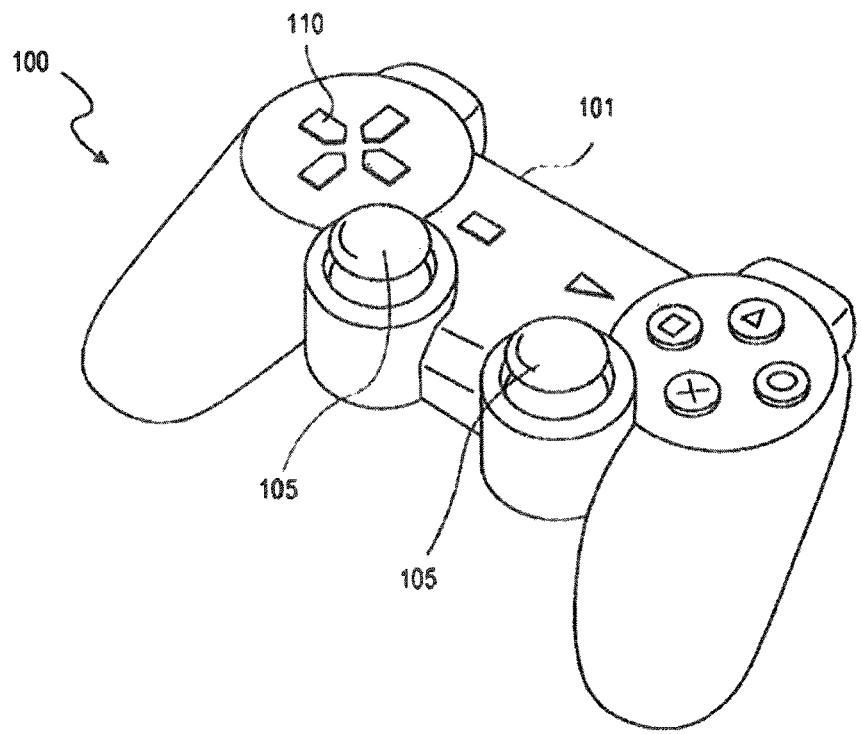
FIG. 2 schematically illustrates a controller provided with one or more sensors to detect interaction with the controller.

FIG. 2 schematically illustrates a controller comprising one or more sensors to detect interaction with the controller. The one or more sensors of the controller 100 may comprise one or more pressure sensitive switches 110, also referred to as buttons, which can be manipulated by a user's digit when holding the controller 100 in order to provide user input for controlling execution of an executable program by an information processing device (such as the processing apparatus illustrated in FIG. 1) in communication with the controller 100. The controller 100 according to the present disclosure may comprise any number of pressure sensitive switches 110 and in some examples may not comprise any pressure sensitive switches 110 at all. The location and number of pressure sensitive switches is exemplary and different configurations are considered by the present disclosure. In some examples, the one or more sensors of the controller 100 comprise one or more thumb sticks 105 which can be displaced from a reference position to provide user input.

Whilst FIG. 2 illustrates a controller 100, such as the Sony® DualShock 4® controller, it will be appreciated that the controller 100 may take a range of different forms.

Figure 3:
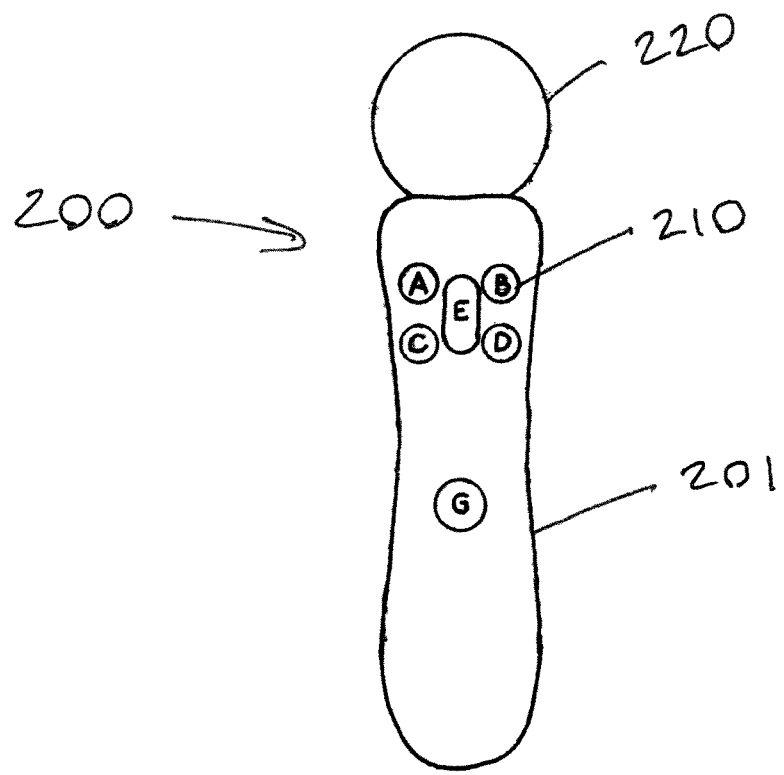
FIG. 3 schematically illustrates another controller provided with one or more sensors to detect interaction with the controller.

In embodiments of the present disclosure, a controller comprising one or more sensors configured to detect interaction with the controller by the user may be implemented by a handheld controller such as the Sony® PlayStation Move® controller. FIG. 3 schematically illustrates the Sony® PlayStation Move® controller as a further example of a controller 200 comprising one or more sensors to detect interaction with the controller 200. The controller 200 optionally comprises a tracking object 220 such as an illuminated ball, which may be used to optically track the controller's position and/or orientation in space by using a camera connected to a host device apparatus (typically a videogame console such as the PlayStation 4® or PC, but potentially a server providing a streamed gaming experience). Other controllers may use a different configuration of optical tracking objects, or not include these at all.

While FIGS. 2 and 3 illustrate handheld controller devices, it will be appreciated that other input devices may be appropriate. For example, a wristband or armband with sensors that detect position, orientation and/or motion or any other peripheral device comprising at least one of a gyroscope, an accelerometer and a magnetometer may be used. Other examples include a head-mounted display such as the Sony® PlayStation VR®.

Figure 4:
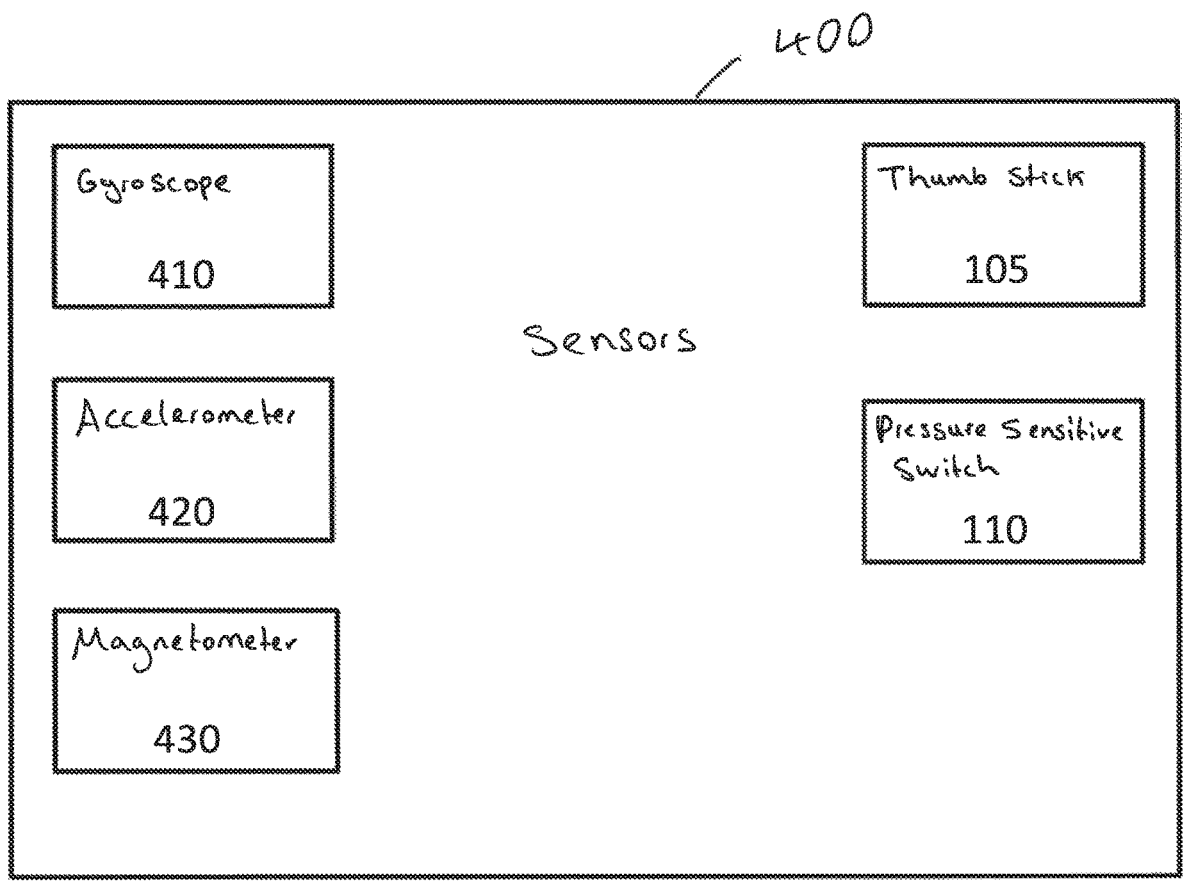
FIG. 4 schematically illustrates hardware to detect interaction with the controller.

Referring now to FIG. 4, in embodiments of the disclosure the controller 100, 200 comprises one or more sensors 400 comprising one or more from the list consisting of: a gyroscope 410, an accelerometer 420, a magnetometer 430, a pressure sensitive switch 110 and a thumb stick 105. The one or more sensors 400 are each configured to detect interaction by the user with the controller 100, 200, by detecting one or more properties of the controller such as controller position, controller orientation and/or a closed or open state of a pressure sensitive switch, and by generating a corresponding output indicative of the one or more properties detected by one or more of the sensors. The gyroscope sensor 410 detects an angular velocity of the controller 100; the accelerometer sensor 420 detects an acceleration of the controller; and the magnetometer 430 detects magnetic flux density which changes in response to motion of the controller. The properties of the signals generated by the sensors 410, 420, 430 can be used for detecting interactions by the user with the controller 100, 200. Hence, data that is output by one or more of the sensors 400 can be used to detect a current configuration or a status of the controller and changes in the configuration of the controller resulting from interaction with the controller by the user can thus be detected and used for analysis. In this way, manipulations of the controller 100, 200 by the user can be detected by one or more of the sensors 400 and data output by a sensor provides an indication of the interaction by the user with the controller 100, 200. For example, during use of the controller 100, 200, the user may on average hold the controller 100, 200 at a given mean position and/or at a given mean orientation and the data that is output by the accelerometer 420 and/or gyroscope 410 and/or magnetometer 430 can provide an indication of the given mean position and/or given mean orientation, respectively, resulting from interaction by the user with the controller 100, 200.

Generally, the one or more sensors 400 may comprise any sensor known in the art that is capable of measuring relative changes in a magnetic field or measuring a magnitude and a direction of acceleration in its own rest frame or measuring an angular velocity and generating information corresponding to a detected change in the measured property. In some examples, the one or more sensors 400 may comprise a plurality of accelerometer sensors 420, where a first accelerometer is configured to measure a magnitude of an acceleration with respect to a first axis (e.g. one of an X, Y or Z axis) and a second accelerometer is configured to measure a magnitude of an acceleration with respect to a second axis. Similarly, the one or more sensors 400 may comprise a plurality of gyroscope sensors 410, where a first gyroscope is configured to measure an angular velocity with respect to a first axis (e.g. one of an X, Y or Z axis) and a second gyroscope is configured to measure an angular velocity with respect to a second axis. In this case, outputs of each of the plurality of gyroscope sensors 410 and accelerometer sensors 420 can be combined to provide a measure of a three-dimensional position, pitch, roll and yaw of the controller.

Data indicative of the information generated by the one or more sensors can be transmitted by a transmitter of the controller 100, 200 and the state of an executing application at the information processing device may be updated in response to changes in the position, orientation and/or motion of the controller or a configuration of one or more of the pressure sensitive switches 110. In some examples where the input device 100 does not comprise a pressure sensitive switch 110, user input may be provided based on an output generated by the accelerometer and/or the gyroscopic sensor included on or within the body 101 of the input device. It will be appreciated that techniques such as magnetism, ultrasound, GPS, picocell/WiFi® radio triangulation, laser or light interferometry or other suitable motion tracking techniques localised in the controller 100, the console (or a separate sensor peripheral) or any combination of the above may be used to detect interaction with the controller. As such, other types of sensor may similarly be considered in addition to those illustrated in FIG. 4.

The controller 100, 200 comprises at least one transmitter (not shown in the Figures) configured to transmit data indicative of the data that is output by one or more of the sensors 400. The transmitter is configured to transmit data indicative of the data that is output by the one or more of the sensors 400 according to a wireless communication comprising one or more from the list consisting of: Bluetooth®; infrared wireless; and ultra wideband. Other personal area network (PAN) wireless technologies may similarly be considered such as ZigBee or Body area network. The Bluetooth® 1010 wireless communication uses a low power technology standard that is capable of transmitting data over distances of approximately 10 metres using short wavelength radio waves from 2.4 GHz to 2.485 GHz. Alternatively or in addition, the transmitter may wirelessly communicate data using infrared wireless 1020 signals to establish a wireless communication link with another device in line-of-sight. Alternatively or in addition, the transmitter may use ultra wideband 1030 wireless communication, which uses direct sequence ultra wide band and multiband orthogonal frequency division multiplexing to transmit information at time intervals. In some examples, the controller 100, 200 may communicate the data indicative of the data that is output by one or more of the sensors 400 to an information processing device via a wired connection.

In embodiments of the disclosure the transmitter is configured to transmit telemetry data based on the outputs of one or more of the sensors 400. The telemetry data transmitted by the transmitter comprises one or more from the list consisting of: controller position data, controller acceleration data, controller angular velocity data, controller orientation data, controller motion data, and data indicative of a configuration of one or more of the pressure sensitive switches 110 of the controller 100, 200. In some examples, the transmitter is configured to transmit the telemetry data, wherein the telemetry data comprises: position data indicative of an X coordinate, Y coordinate and Z coordinate with respect to a real-world space; and orientation data indicative of pitch, roll and yaw with respect to the real-world space. As such, interactions with the controller 100, 200 can be detected by the one or more sensors and the transmitter can transmit telemetry data indicative of the outputs of one or more of the sensors 400. The transmitter can be configured to transmit the telemetry data to the information processing device 10 as a data stream comprising a plurality of data packets. The data transmitted by the transmitter comprises time information in the form of a timestamp associated with each sensor measurement for which data is transmitted. As such, the telemetry data can provide an indication of a position and orientation of the controller 100, 200 as well as changes in position and orientation with respect to time to provide an indication of controller motion. Alternatively or in addition, the telemetry data can provide an indication of a state of a pressure sensitive switch (closed or open configuration), and specifically a duration associated with each state of the pressure sensitive switch. For example, when the user presses one of the pressure sensitive switches 110, the telemetry data can provide an indication of which switch is pressed and a period of time for which the switch is in a closed state.

Optionally for any one of the outputs generated by the one or more sensors 400, raw signal data or partially processed data may be transmitted instead, for additional processing by the information processing unit 10 (e.g. the PlayStation 4®). This may consequently reduce the cost, size and/or weight of the input device, and/or increase battery life and/or enable use of a brighter light source for a similar battery life, for example.

Figure 5:
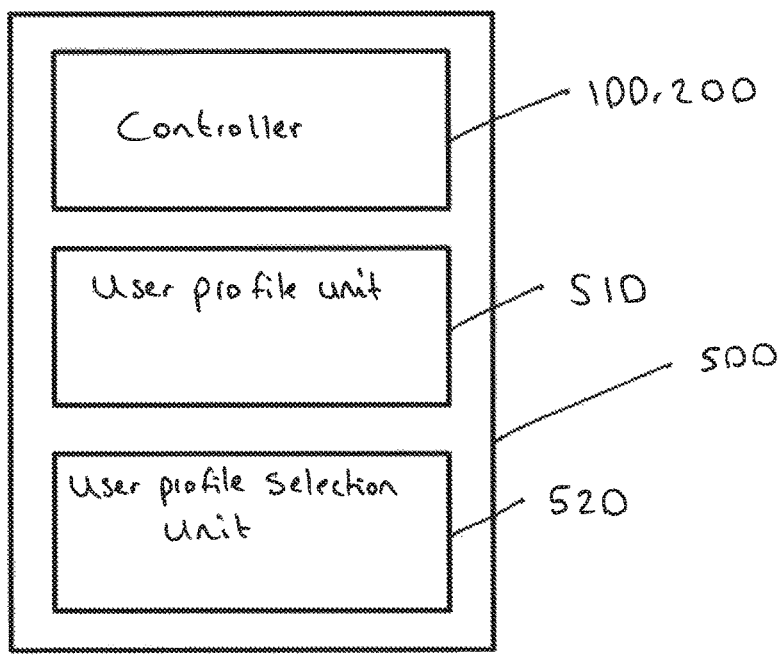
FIG. 5 schematically illustrates a system for identifying a user of the controller.

Referring now to FIG. 5, in embodiments of the disclosure, a system 500 for identifying a user of a controller comprises: a controller 100, 200 comprising one or more sensors 400 configured to detect interaction with the controller by the user and a transmitter configured to transmit telemetry data based on outputs of one or more of the sensors; a user profile unit 510 configured to obtain user profile data for one or more user profiles, wherein each user profile corresponds to a respective user and the user profile data for a user profile comprises data indicative of one or more characteristic interactions by the user with the controller; and a user profile selection unit 520 configured to select a user profile from the one or more user profiles in dependence upon a degree of match between one or more properties of the transmitted telemetry data and the data of each respective user profile, and configured to modify an output of the system responsive to the selection.

The user profile unit 510 and the user profile selection unit 520 may be provided as part of an information processing apparatus, such as that illustrated in FIG. 1 or another information processing apparatus comprising a central processing unit (CPU). The user profile unit 510 can obtain the user profile data for the one or more user profiles from a server or from one or more storage components provided as part of the information processing apparatus, such as the hard disk drive 37 or the RAM unit 22. Alternatively or in addition, the user profile unit 510 may comprise a storage medium and the user profile unit 510 may be configured to store user profile data for one or more user profiles.

In some examples, a user may play a game executed by the information processing apparatus and the user may operate the controller 100, 200 to control execution of the game. During the user's gameplay, telemetry data transmitted by the controller 100, 200 and thus received by the information processing apparatus may be stored for the user in order to gather data for populating the user profile data for the user's profile. In this way, telemetry data transmitted by the controller 100, 200 during use by the user may be recorded and associated with the user's profile such that the user profile comprises data indicative of one or more characteristic interactions by the user with the controller 100, 200. For example, whilst using the controller 100, 200, telemetry data transmitted by the controller 100, 200 comprising the controller position data, controller orientation data, controller motion data and/or data indicative of a configuration of one of more of the pressure sensitive switches can be received by the information processing device and recorded for the user's profile. As such, the user profile data may comprise telemetry data indicative of one or more characteristic interactions by the user with the controller. Alternatively or in addition, the telemetry data transmitted by the controller 100, 200 may be subjected to processing in order to determine one or more properties or features for the telemetry data so that data (e.g. refined data) resulting from processing the telemetry data can be stored in association with the user's profile. By processing the telemetry data transmitted by the controller 100, 200 to extract one or more properties or features from the telemetry data and subsequently storing refined data for the user's profile, the amount of user profile data stored for a user profile can thus be reduced. For example, the telemetry data transmitted by the controller 100, 200 may comprise controller position data (X, Y, Z) and controller orientation data (pitch, roll, yaw) and the user profile data may comprise the telemetry data including the controller position data and the controller orientation data or the user profile data may comprise data indicative of one or more properties extracted from the telemetry data.

As such, interactions with the controller 100, 200 when used by the user can be detected, and data indicative of one or more characteristic interactions by the user with the controller 100, 200 can be stored as user profile data for the user's profile. For example, a user may on average hold the controller 100, 200 with a given orientation (e.g. the left-hand side of the controller may be slightly elevated with respect to the right-hand side of the controller) or at a given position (e.g. the user's height may mean that the user has a tendency to hold the controller at a certain vertical position) and the user profile data for the user's profile can comprise data indicative of one or more such characteristic interactions by the user. Similarly, the user profile data for a second user's profile may indicate that on average the second user holds the controller 100, 200 at a given vertical position (e.g. a mean value of a Y coordinate obtained from the accelerometer 420 may provide such an indication) correlated with the second user's physical height, and this data may be used for comparison with the telemetry data transmitted by the controller at any given time to make a determination of whether the person currently using the controller is the second user.

The telemetry data transmitted by the controller 100, 200 during use by the user may be processed to determine one or more properties of the transmitted telemetry data which can be stored in association with the user's profile. One or more of the properties of the transmitted telemetry data can thus be used for comparison with one or more properties of the data for the user's profile indicative of one or more characteristic interactions by the user with the controller 100, 200 to determine a degree of match between the data for a user's profile and the transmitted telemetry data for use in determining who is currently using the controller 100, 200. In embodiments of the disclosure, the one or more properties of the transmitted telemetry data comprise one or more from the list consisting of: a maximum velocity of the controller; a minimum velocity of the controller; a mean velocity of the controller; a median velocity of the controller; a standard deviation of the velocity of the controller; a variance of the velocity of the controller; a range of the velocity of the controller; a mean position of the controller; a mean orientation of the controller; a vertical height difference between the mean position of the controller and an initial resting position of the controller; and a mean period of time for which a given pressure sensitive switch of the controller has a closed configuration when operated by the user.

The telemetry data transmitted by the controller 100, 200 can be obtained by the information processing apparatus 10 comprising the user profile unit 510 and the user profile selection unit 520, and one or more of the above mentioned properties can be extracted from the telemetry data for use when comparing the transmitted telemetry data with the user profile data. For example, the telemetry data transmitted by the controller 100, 200 may comprise controller position data and controller orientation data which can be used to determine motion of the controller to allow properties such as the maximum velocity, minimum velocity or mean velocity of the controller for a given period of time, such as 60 seconds for example. The controller 100, 200 has a given resting position prior to the user picking up the control 100, 200, (e.g. the previous user of the controller may have left the controller on a table or the floor) and a vertical height difference between the initial resting position and the mean position of the controller during use by the user having picked up the controller 100, 200 may be determined and compared with the user profile data for each user for determining the degree of match between a user profile and the transmitted telemetry data.

The user profile unit 510 can thus be configured to obtain user profile data for one or more user profiles and the user profile data for each user profile can be compared with the telemetry data transmitted by the controller 100, 200 in order to calculate a degree of match between the user profile data and the transmitted telemetry data for each user profile. The user profile unit 510 can obtain both the user profile data for one or more user profiles and the transmitted telemetry data, and the user profile selection unit 520 is configured to select a user profile from the one or more user profiles based on the degree of match between one or more properties of the transmitted telemetry data and the user profile data. The transmitted telemetry data and the user profile data can each be processed to determine one or more properties, and at least one property of the transmitted telemetry data can be compared with at least one property of the data indicative of one or more characteristic interactions by the user with the controller to determine a degree of match between the transmitted telemetry data and a user profile.

Figure 6:
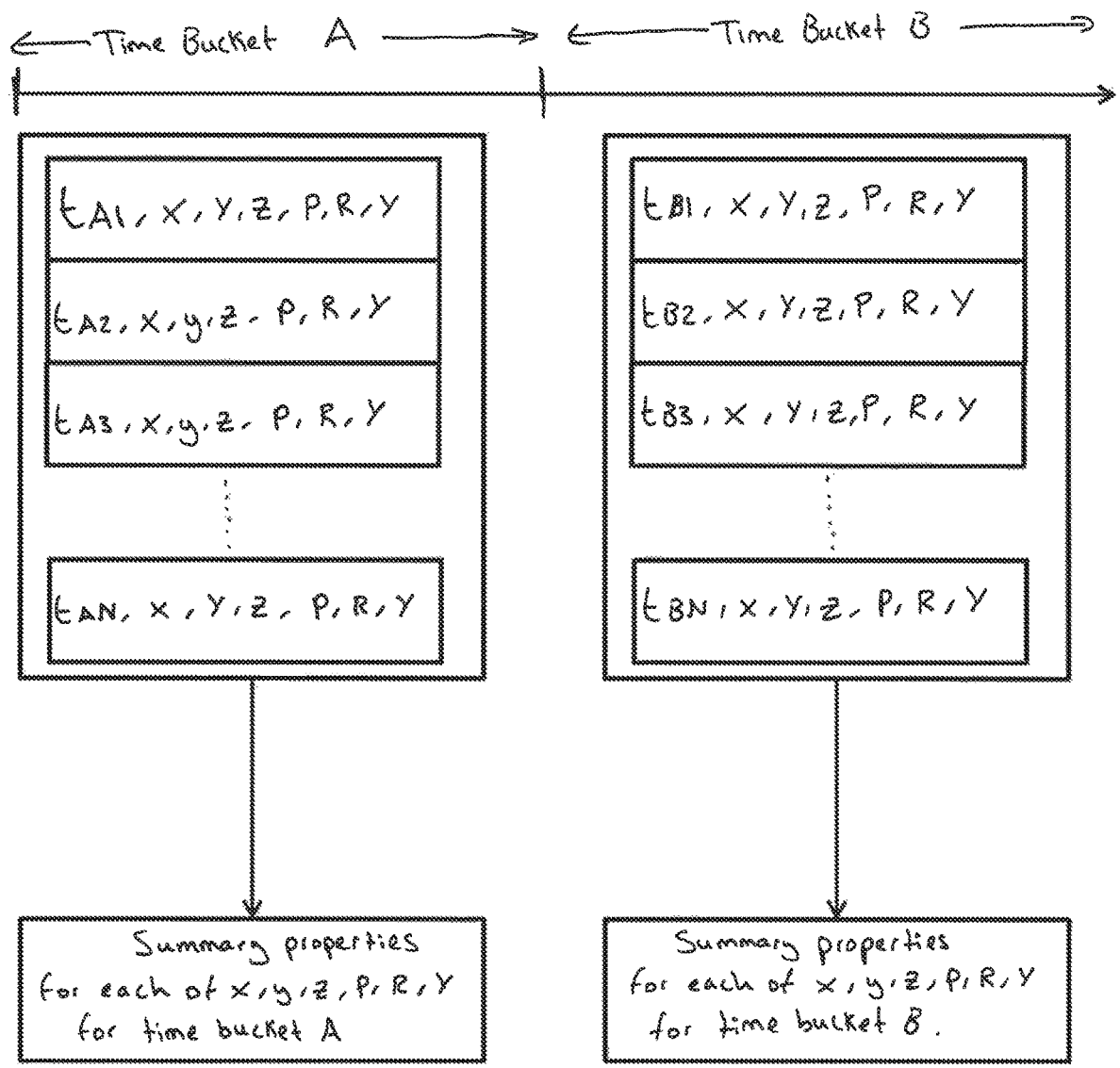
FIG. 6 schematically illustrates an example of determining one or more properties for telemetry data transmitted by the controller.

Referring now to FIG. 6, an example of determining one or more properties for transmitted telemetry data will now be described based on telemetry data comprising controller position data and controller orientation data. In this example, the controller 100, 200 comprises one more of the sensors 400 and the transmitted telemetry data comprises 6 respective data types: X-coordinate, Y-coordinate, Z-coordinate, pitch (P), roll (R) and yaw (Y). The telemetry data may be transmitted by the transmitter, in which a respective timestamp is associated with a set of data points comprising a data point for each data type. For example, a first set of data points may be transmitted at time tA1 with a first timestamp and another set of data points may be transmitted at time tA2 with a second timestamp. The telemetry data can be considered as a data stream comprising a plurality of time buckets, in which each time bucket comprises a plurality of sets of data points. In FIG. 6, time bucket A comprises N sets of data points and time bucket B also comprises N sets of data points, however in some examples the number of sets of data points in time bucket A may be different to the number of sets of data points in time bucket B. Each time bucket may have an associate time range (width) in units of seconds such that each time bucket comprises a plurality of sets of data points each having timestamps corresponding to time value within the time range of the time bucket. For example, each time bucket may have a width of 500 milliseconds or in some cases a width of 10 seconds may be used for example, and the transmitter may be configured to transmit the sets of data points at a frequency in the range 125 Hz to 600 Hz. Other values are considered by the present disclosure.

For each data type (X, Y, Z, P, R or Y) one or more summary properties can be determined for each time bucket. In other words, one or more summary statistics can be calculated for each time bucket using a statistical calculation. For example, for each time bucket, the user profile selection unit 520 can determine one or more properties for the telemetry data comprising one or more from the list consisting of: a minimum, a maximum, a mean, a 10th percentile, a 20th percentile, a 30th percentile, a 40th percentile, a median (50th percentile), a 60th percentile, a 70th percentile, an 80th percentile, a 90th percentile, a variance, a standard deviation, a standard error of the mean, an interquartile range, a coefficient of variation, a mean absolute deviation, and a range. For example, each of the above mentioned properties may be determined for each of the 6 data types resulting in 19 properties for each data type and a total of 114 properties for a given time bucket (6×19=114). In this way, one or more properties can be determined and a comparison between one or more of the properties determined for the transmitted telemetry data and one or more corresponding properties determined for the user profile data can be used to determine a degree of match between the transmitted telemetry data and each user profile. By determining one or more properties for each time bucket as discussed above and using the properties for comparison with the user profile data, variations in accelerometer and/or gyroscope measurements can be identified and used for comparison with user profile data characteristic of an interaction by a user with the controller to determine whether a user corresponding to one of the user profiles is using the controller.

For example, a comparison between a median value of the data point corresponding to the X coordinate determined for the transmitted telemetry data and a median value of an X coordinate determined for the user profile data for a user may be used to determine the degree of match between the transmitted telemetry data and the data for a user profile. Similarly, a comparison between the range of the X coordinate, or the Y coordinate or the Z coordinate for the transmitted telemetry data and the range of the X coordinate, or the Y coordinate or the Z coordinate for a user's profile data may be used to determine the degree of match. In some examples, a first user's interaction with the controller 100, 200 may be characterised by a vertical height at which the user holds the controller 100, 200 and a difference between the largest vertical height and the smallest vertical height (statistical range) of the controller 100, 200. For example, a tall user having long arms may be characterised by a large mean or median vertical height for the controller 100, 200 and a large range in the vertical height for the controller 100, 200. Conversely, a short user having short arms may be characterised by a small mean or median vertical height for the controller 100, 200 and a small range in the vertical height for the controller 100, 200. Consequently, the mean or median vertical height and the range in the vertical height may be useful properties for distinguishing the tall user from the short user. Similarly, the motion of the controller (change in position and/or orientation with respect to time) may be different for one user compared to another users, as some user's may have a greater tendency than other to move their arms and hands while using the controller; a first user's controller interaction may be characterised by a larger mean velocity or a pattern in the motion of the controller, whereas a second user's controller interaction may be characterised by a smaller mean velocity.

The user profile unit 510 can obtain the user profile data for the one or more user's and one or more of the above mentioned properties can be selected for each user for comparison with the telemetry data, wherein properties indicative of a user's characteristic interactions, which can distinguish one user from the plurality of user's, can be selected for each given user for comparison with the telemetry data. The user profile selection unit 520 can thus be configured to select these properties from the user's profile data for comparison with the transmitted telemetry data (transmitted telemetry data is indicative of a current status of the controller 100, 200) when determining a degree of match for the user profile with respect to the transmitted telemetry data. In this way, one or more properties corresponding to characteristics interactions by the user can be selected for comparison with the transmitted telemetry data and a degree of match can be determined for each user profile.

In embodiments of the disclosure the user profile selection unit 520 is configured to calculate a confidence score for each of the one or more user profiles, the confidence score indicative of the degree of match between one or more of the properties of the transmitted telemetry data and the data of each respective user profile. For each user profile, the data that is characteristic of an interaction by the user with the controller can be compared with the transmitted telemetry data using one or more of the above mentioned properties, and a confidence score can be calculated for each user profile to provide a numerical indication of the degree of match between the transmitted telemetry data and each user profile. Therefore, a confidence score obtained for each user profile of the plurality of user profiles can be used to identify the user profile for which the data characteristic of interaction by the user with the controller has the greatest level of correspondence with the transmitted telemetry data. In some examples, the confidence score may have a value ranging from 0 to 1 (or 0 to 100), where a smaller value corresponds to a lower degree of match and a higher value corresponds to a higher degree of match.

FIG. 7 schematically illustrates an example of confidence scores obtained for user profiles. The user profile selection unit 520 is configured to calculate a confidence score for each of the one or more user profiles based on the degree of match. In the example shown the confidence scores each have a value ranging from 0 to 1, where 0 indicates a minimum confidence rating and 1 indicates a maximum confidence rating. As such, the confidence score for user A is 0.95 which indicates a high degree of match between the user profile data for user A and the telemetry data transmitted by the controller. Conversely, the confidence score for user D is 0.08 which indicates a low degree of match between the user profile data for user A and the telemetry data transmitted by the controller. In this case, the confidence scores indicate that for the plurality of user profiles compared with the telemetry data, user profile A has the greatest degree of match and that the user corresponding to user profile A is the user that is most likely to be using the controller.

Figure 8:
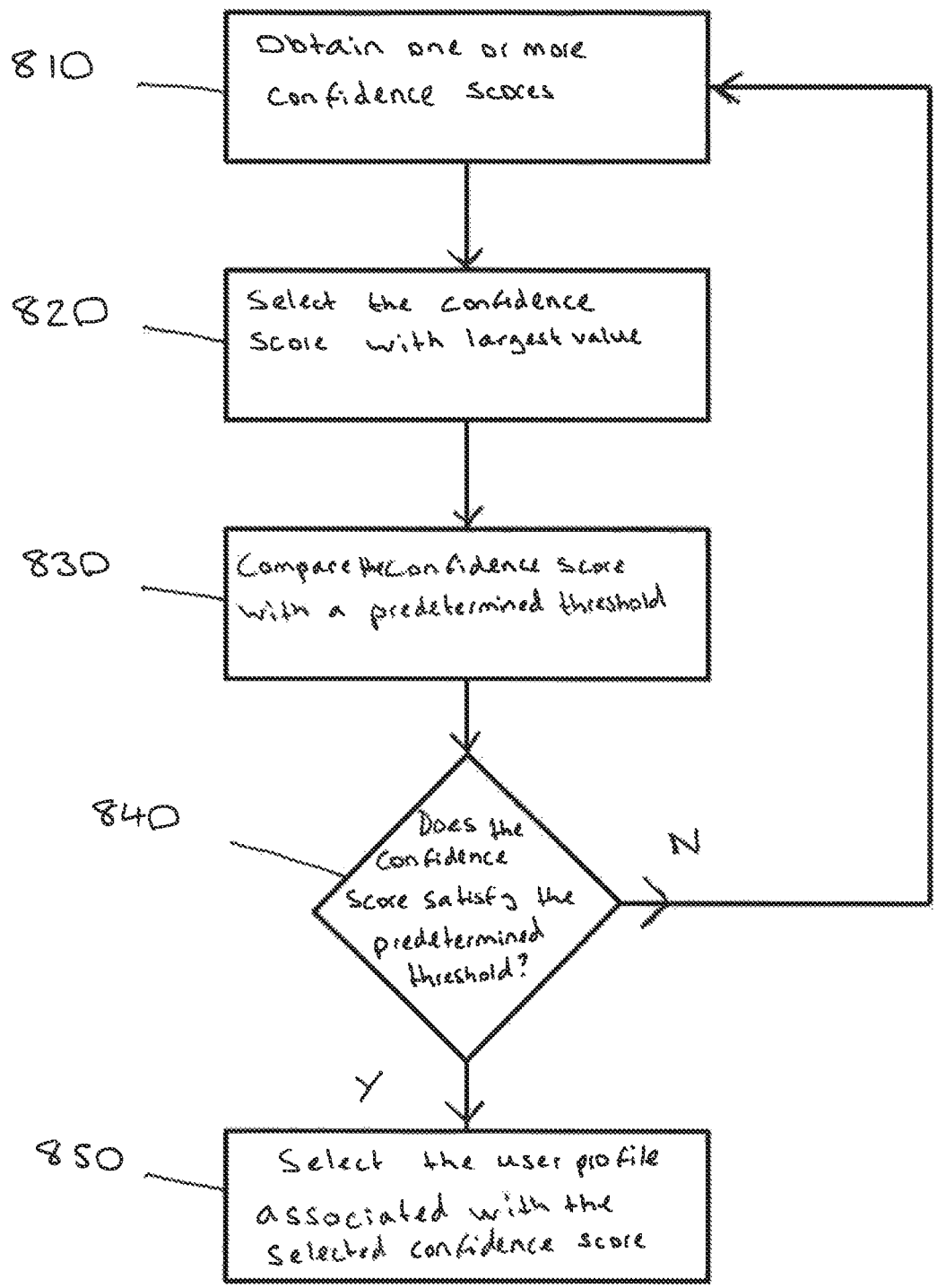
FIG. 8 schematically illustrates an example of a predetermined threshold condition used for selecting a user profile.

In embodiments of the disclosure the user profile selection unit 520 is configured to select the user profile from the one or more user profiles by determining whether the confidence score for a given user profile satisfies a predetermined threshold condition. FIG. 8 illustrates an example of selecting the user profile based on the predetermined threshold condition. The user profile selection unit 520 is configured to obtain (at a step 810) a confidence score for each of the one or more user profiles, to select (at a step 820) a confidence score having the greatest value (highest confidence rating) from the one or more confidence scores, to compare (at a step 830) the confidence score having the greatest value with a predetermined threshold condition and to determine (at a step 840) whether the confidence score having the greatest value satisfies the predetermined threshold condition. When it is determined, at the step 840, that the confidence score having the greatest value satisfies the predetermined threshold condition, the user profile selection unit 520 is configured to select (at a step 850), from the one or more user profiles, the user profile associated with the confidence score having the greatest value. When it is determined, at the step 840, that the confidence score having the greatest value does not satisfy the predetermined threshold condition, the process returns to the step 810 to obtain the one or more confidence scores so that the steps 820, 830, 840 and 850 can be performed using confidence scores for which the values have since been updated in response to the telemetry data transmitted by the controller 100, 200. As such, at the time when the process returns to the step 810 the values for the one or more confidence scores may have changed in response to changes in one or more properties of the transmitted telemetry data meaning that the degree of match between the transmitted telemetry data and the user profile data for a user profile, which is reflected in the value of the confidence score for the user profile, has changed.

For example, the user profile unit 510 may obtain user profile data for a plurality of user profiles and the user profile selection unit 520 can select the user profile having the greatest degree of match with the transmitted telemetry data on the basis of which user profile has the confidence score indicating the greatest level of confidence. Once the user profile having the greatest value for the confidence score has been selected, the value of the confidence score is compared with the predetermined threshold condition. For example, the predetermined threshold condition may comprise a threshold value, such as 0.7 (or 70) for example, such that a confidence score having a value less than 0.7 (or 70) will not satisfy the threshold condition. The value used for the threshold value may be set to have a default value such as 0.7 or a value in the range the range 0.5 to 0.9 may be chosen. Alternatively, each user may be able to select a threshold value for use with their user profile. A first user may choose to have a first threshold value which can be used for determining whether their user profile is selected when their user profile has the largest confidence score among the plurality of user profiles, and a second user may choose to have a different threshold value which can be used for determining whether their user profile is selected when their user profile has the largest confidence score among the plurality of user profiles.

It will be appreciated that the processing illustrated in FIG. 8 may be performed periodically such that a periodic assessment of the confidence scores is performed to periodically select the confidence score having the greatest value (highest confidence rating) for comparison with the predetermined threshold condition to determine whether to select a user profile from the one or more user profiles. For example, at the step 850 where the user profile associated with the confidence score having the greatest value is selected, the process illustrated in FIG. 8 may be repeated after a given period of time (e.g. 5 seconds) has elapsed.

In some examples, when it is determined at the step 840 that the confidence score having the greatest value does not satisfy the predetermined threshold condition, instead of returning to the step 810, the process may simply end. For example, when the transmitted telemetry data indicates that the controller 100, 200 is not in use (e.g. telemetry data indicates that the controller 100, 200 is stationary for a given period of time) instead of returning to the step 810 the process may end. In this case, the process illustrated in FIG. 8 may be resumed in response to an indication from the telemetry data that the controller 100, 200 is in use, such as in response to the user pressing one of the pressure sensitive switches (button press) or in response to a variation in one or more of the properties of the transmitted telemetry data.

The user profile selection unit 520 is configured to select a user profile from the one or more user profiles in accordance with the techniques discussed above, and the user profile selection unit 520 can modify an output of the system 500 responsive to the selection of a user profile. In embodiments of the disclosure, in response to the modification of the output of the system the user profile selection unit 520 is configured to either request the user to confirm the selection of the user profile or automatically permit access to the selected user profile. An output of the system 500 may include a signal output by the user profile unit 520 or signal output by another processing unit of the system 500, and the output of the system 500 can be modified in dependence upon the selection of the user profile by the user profile selection unit 520. The output of the system 500 may be modified to request the user to confirm the selection of a user profile in response to a selection of that user profile by the user profile selection unit 520. For example, the output of the system 500 may be modified in a manner such that an image signal is generated for presentation by a display unit (such as the display unit 51) to the user so that the user can respond in order to confirm the selection or reject the selection. Alternatively or in addition, the output of the system 500 may be modified in a manner such that an audio signal is generated which can be emitted by an audio output unit (e.g. a speaker) possibly included as part of the display unit or as part of a separate device so that the user can provide the response for confirming or rejecting the selection. For example, the user profile unit may obtain user profile data for a plurality of user profiles and in the case where the user profile selected by the user profile selection unit 520 does not correspond to the user that is currently using the controller 100, 200, the user can reject the selection of the user profile. Similarly, for the case where the user profile selected by the user profile selection unit 520 does correspond to the user that is currently using the controller 100, 200, the user can provide a response to the output of the system 500 to confirm the selection of the user profile so that the user is logged-in to the selected user profile and is permitted to access the user profile.

The system 500 can be configured, in response to the modification of the output of the system 500, to automatically permit access to the user profile selected by the user profile selection unit 520. As discussed previously, the user profile selection unit 520 can select one user profile from the one or more user profiles on the basis of a degree of match (level of correspondence) between one or more properties of the transmitted telemetry data and the user profile data for a user profile, and selection of one user profile by the user profile selection unit 520 can modify the output of the system 500 in a manner that automatically grants access to the user profile such that a log-in operation is automatically performed for the selected user profile without requiring the user to provide a password. In this way, the system 500 can identify a user profile which corresponds to the user using the controller 100, 200 on the basis of detection of interaction with the controller, and the user profile for the user using the controller 100, 200 can be selected by the system so that access to the selected user profile can be automatically permitted. In other words, the techniques of the present disclosure can determine whether one of the user profiles corresponds to the person using the controller at any given time using properties of telemetry data, so that the person using the controller can be logged-in to their account when using the controller and logged-out of their account when ceasing to use the controller without requiring the user to enter a password or perform a log-out operation.

In embodiments of the disclosure the transmitter is configured to periodically transmit the telemetry data and the user profile selection unit 520 is configured to periodically select the user profile from the one or more user profiles in dependence upon a periodic analysis of the degree of match between the transmitted telemetry data and the data of each respective user profile. As discussed previously, the controller 100, 200 can be configured to periodically transmit the telemetry data based on the outputs of one or more of the sensors 400, and the user profile selection unit 520 can perform a periodic analysis of the transmitted telemetry data with respect to the user profile data. In this way, for a situation in which a first user uses the controller 100, 200 and subsequently passes the controller 100, 200 to another user, the system 500 can select the user profile corresponding to the first user when the controller 100, 200 is in use by the first user and the system 500 can select the user profile corresponding to the other user when the controller 100, 200 is in use by the other user. The system 500 may be configured to periodically determine the degree of match between a user profile and the transmitted telemetry data such that the degree of match is obtained for each user profile every 5 seconds, for example. It will be appreciated the time period used for periodically determining the degree of match between a user profile and the transmitted telemetry data may have any suitable value, such as anywhere within the range 1 second to 60 seconds.

In embodiments of the disclosure the controller comprises an electric motor configured to generate a force for providing a haptic signal to the user of the controller, and the user profile selection unit is configured to select the user profile from the one or more user profiles in dependence upon one or more of the properties of the telemetry data transmitted by the transmitter within a predetermined period of time following the provision of the haptic signal to the user of the controller. The Sony® DualShock 4® controller and Sony® PlayStation Move® controller, for example, each comprise electric motors for driving an eccentric mass having its centre of mass displaced away from the axis of rotation such that a vibration is transmitted to the body of the controller which is perceptible to the user holding the controller. The electric motor provided within the body of the controller 100, 200 may take a variety of different forms, such as a coin vibration motor using an eccentric rotating mass (ERM). As such, an electric current can be supplied to an electromagnet of the electric motor to drive the electric motor and thus provide a haptic signal to the user of the controller at a given time. The electric motor may be used to provide a haptic signal to the user of the controller so that a characteristic reaction of a user to such a haptic signal can be used for analysis when attempting to identify which user profile corresponds to the current user of the controller. For each user profile, the data indicative of one or more characteristic interactions by the user with the controller may additionally comprise data characteristic of impulsive behaviour of the user in response to such a haptic signal. For example, telemetry data transmitted by the controller 100, 200 following the generation of a haptic signal by the electric motor may be recorded (or processed to obtain one or more properties and then recorded) for a user so that the user profile data for a user profile comprises data indicative of an impulse response by the user to the haptic signal. In this way, the electric motor can be used to provide a haptic signal to the user of the controller, and the telemetry data transmitted within a predetermined period of time (e.g. 1 second) following the provision of the haptic signal can be used for analysis when performing selection of the user profile. Different users may react differently to the haptic signal, and properties of the telemetry data corresponding to the reaction of the user in response to the haptic signal can be used to distinguish one user from another user. For example, a first user may react to the haptic signal by adjusting the position of the controller 100, 200 to be closer to their body (such that the controller moves in a first direction away from the mean position when the controller is held by the first user) whereas another user may instead react to the haptic signal by adjusting the position of the controller 100, 200 to be further away from their body (such that the controller moves in a second direction away from the mean position when the controller is held by the second user). Alternatively or in addition, a given user may adjust an orientation of the controller 100, 200 in a specific manner that uniquely identifies that user from the other users (e.g. the user may rotate the controller 100, 200 such that the user's reaction is characterised by a specific change in the pitch, yaw and/or roll of the controller indicated by the transmitted telemetry data).

In embodiments of the disclosure the user profile selection unit 520 is configured to input the transmitted telemetry data and the data of each respective user profile to a model, and wherein the model is trained to determine one or more of the properties of the transmitted telemetry data and to compare one or more of the properties of the transmitted telemetry data with one or more corresponding properties of the data of each respective user profile to determine the degree of match between the transmitted telemetry data and the data of each respective user profile. During training, data indicative of one or more characteristic interactions by a user with the controller can be used as an input to a multi-class logistic regression model. Data for individual users can be used during training of the model, and relationships between certain properties of the data for a given user can be identified as being capable of uniquely identifying the given user with respect to the plurality of users. Moreover, using multinomial logistic regression techniques, relationships between one or more properties of the data indicative of one or more characteristic interactions by the user with the controller, which can be used to distinguish one user from another user, can be identified for each user.

The model is thus trained to obtain a first instance of data (such as the telemetry data transmitted by the controller) and a second instance of data (such as the user profile data comprising data characteristic of interaction by the user with the controller) as an input, and to compare the two instances of data by comparing certain properties of the data in order to determine a degree of match between the two instances of data. For example, the model can be trained to use the transmitted telemetry data (or data resulting from processing of the transmitted telemetry data) and the user profile data for a user as an input. For both the transmitted telemetry data and the user profile data, the model can determine one or more of the following properties: a minimum associated with the controller position data (e.g. minimum X coordinate, minimum Y coordinate and/or minimum Z coordinate); a minimum associated with the controller orientation data; a maximum associated with the controller position data; a maximum associated with the controller orientation data; a mean associated with the controller position data; a mean associated with the controller orientation data, a $10^{th}$ percentile associated with at least one of the controller position data and the controller orientation data; a $20^{th}$ percentile associated with at least one of the controller position data and the controller orientation data; a $30^{th}$ percentile associated with at least one of the controller position data and the controller orientation data; a $40^{th}$ percentile associated with at least one of the controller position data and the controller orientation data; a median ($50^{th}$ percentile) associated with at least one of the controller position data and the controller orientation data; a $60^{th}$ percentile associated with at least one of the controller position data and the controller orientation data; a $70^{th}$ percentile associated with at least one of the controller position data and the controller orientation data; an $80^{th}$ percentile associated with at least one of the controller position data and the controller orientation data; a $90^{th}$ percentile associated with at least one of the controller position data and the controller orientation data; a variance associated with at least one of the controller position data and the controller orientation data; a standard deviation associated with at least one of the controller position data and the controller orientation data; a standard error of the mean associated with at least one of the controller position data and the controller orientation data; an interquartile range associated with at least one of the controller position data and the controller orientation data; a coefficient of variation associated with at least one of the controller position data and the controller orientation data; a mean absolute deviation associated with at least one of the controller position data and the controller orientation data; and a range associated with at least one of the controller position data and the controller orientation data.

Using one or more of the above mentioned properties (summary statistics) the model can compare one or more of the properties for the first instance of data with one of more of the properties for the second instance of data to determine a degree of match between the two instances of data. By learning relationships between one or more of the properties and each user so as to learn which properties can be used to distinguish each user, the model can identify for a given user profile which properties of the data for the user profile should be used for comparison with the transmitted telemetry data when determining the degree of match between the user profile and the transmitted. In a specific example, for the above mentioned properties, the model may identify that a minimum associated with the controller position data, a mean associated with the controller orientation data, a $70^{th}$ percentile associated with at least one of the controller position data and the controller orientation data, and a range associated with at least one of the controller position data and the controller orientation data are useful properties for distinguishing a first user from the other users, because the values associated with each of these respective properties represent a combination that is observed only for the first user. However, for a second user the model may identify a different set of the properties for use in distinguishing the second user from the other users. Consequently, the model can receive the transmitted telemetry data (or data resulting from processing of the transmitted telemetry data) and the user profile data for a user as an input, and for each user profile the model can output a confidence score indicative of the degree of match between the telemetry data and the user profile data.

In embodiments of the disclosure a user recognition model can be trained in advance using multiclass logistic regression techniques, and the trained model can be stored by one or more storage components provided as part of the user profile unit 510 or a storage component such as the hard disk drive 37 or the RAM unit 22 illustrated in FIG. 1. In some examples the user recognition model may be downloaded from a server.

In embodiments of the disclosure the user profile selection unit is configured to input the transmitted telemetry data and the data of each respective user profile to the model, and wherein the model is trained to identify one or more characteristic time-dependent variations in the transmitted telemetry data capable of distinguishing one user from another user and the model is configured to detect whether one or more of the time-dependent variations are present in the transmitted telemetry data. In some examples, the model derives one or more properties regarding motion of the controller from the transmitted telemetry data. The model can be trained to identify one or more time-dependent variations in the data for a user profile which characterise that user's interaction with the controller. For example, small variations (micro variations) in accelerometer and/or gyroscope readings indicative of certain motions of the controller when operated by a given user may be identified as being capable of uniquely identifying the given user.

Referring now to FIG. 9a, in embodiments of the disclosure an apparatus 900 arranged to store a model trained to define a relationship between each user of a plurality of users and one or more properties of data indicative of characteristic interactions by each user with a controller comprises a user profile unit 510, 910 configured to obtain user profile data for a plurality of user profiles, wherein each user profile corresponds to a respective user and the user profile data for a user profile comprises data indicative of one or more characteristic interactions by the user with the controller, a user profile analysis unit 920 configured to determine, for the data indicative of one or more characteristic interactions by the user with the controller, a plurality of properties for each respective user profile, and a correlation unit 930 configured to select one or more properties from the plurality of properties to produce a set of properties for each user profile, wherein each set of properties uniquely identifies the corresponding user profile with respect to the plurality of user profiles, wherein the correlation unit is configured to store a model defining a set of properties for each user profile, each set of properties comprising one or more properties each having an associated value.

It will be appreciated that the user profile unit 910 illustrated in FIG. 9a has the same functionality as the user profile unit 510 illustrated in FIG. 5. The user profile analysis unit 920 can determine a plurality of properties for the data indicative of one or more characteristic interactions by the user with the controller for each user profile. The plurality of properties determined by the profile analysis unit 920 may comprise any of the 114 properties discussed previously with reference to FIG. 6. Using the plurality of properties determined for a given user profile, the correlation unit 930 can select one or more of the properties to produce a set of properties for the given user, the set of properties comprising one or more properties and each property having an associated value. The apparatus 900 can thus obtain user profile data for a plurality of user profiles and produce a set of properties for each user profile such that a first set of properties uniquely identifies a first user from the plurality of users and a second set of properties uniquely identifies a second user from the plurality of users. The correlation unit 930 is thus configured to store a model defining a set of properties for each user profile. In this way, telemetry data transmitted by the controller 100, 200 can be provided as an input for the model and the first set of properties can be compared with the telemetry data to determine a degree of match for the first user's profile and the second set of properties can be compared with the telemetry data to determine a degree of match for the second user's profile.

The apparatus 900 may be provided as part of an information processing apparatus, such as that illustrated in FIG. 1. Alternatively, or in addition, the apparatus 900 may be provided as part of a server apparatus. FIG. 9b illustrates another example of a system 950 comprising the user profile unit 510, 910, the user profile analysis unit 920, the correlation unit 93, the controller 100, 200 and the user profile selection unit 520. In another example, the apparatus 900 can be provided as part of a server apparatus and the system 500 may comprise an information processing apparatus and a controller situated in the user's home environment, where the system 500 is in communication with the apparatus 900 provided as part of a server apparatus. It will be appreciated that different combinations of the apparatus and systems illustrated in FIGS. 5, 9a and 9b are possible.

Referring to FIG. 10, there is provided a schematic flowchart in respect of a method of identifying a user of a controller, comprising:

detecting (at a step 1010), by one or more sensors of a controller, interaction with the controller by the user;

transmitting (at a step 1020) telemetry data based on outputs of one or more of the sensors;

obtaining (at a step 1030) user profile data for one or more user profiles, wherein each user profile corresponds to a respective user and the user profile data for a user profile comprises data characteristic of an interaction by the user with the controller;

selecting (at a step 1040) a user profile from the one or more user profiles in dependence upon a degree of match between one or more properties of the transmitted telemetry data and the data of each respective user profile; and modifying (at a step 1050) an output responsive to the selection.

Referring to FIG. 11, there is provided a method of storing a model trained to define a relationship between each user of a plurality of users and one or more properties of data indicative of characteristic interactions by each user with a controller, comprising:

obtaining (at a step 1110) user profile data for a plurality of user profiles, wherein each user profile corresponds to a respective user and the user profile data for a user profile comprises data indicative of one or more characteristic interactions by the user with the controller;

determining (at a step 1120) for the data indicative of one or more characteristic interactions by the user with the controller, a plurality of properties for each respective user profile;

selecting (at a step 1130) one or more properties from the plurality of properties to produce a set of properties for each user profile, wherein each set of properties uniquely identifies the corresponding user profile with respect to the plurality of user profiles; and storing (at a step 1140) the model defining a set of properties for each user profile, each set of properties comprising one or more properties each having an associated value.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for identifying a user of a controller, comprising:

a controller comprising one or more sensors configured to detect interaction with the controller by the user and a transmitter configured to transmit telemetry data based on outputs of one or more of the sensors;

a user profile unit configured to obtain user profile data for one or more user profiles, wherein each user profile corresponds to a respective user and the user profile data for a user profile comprises data indicative of one or more characteristic interactions by the user with the controller; and a user profile selection unit configured to select a user profile from the one or more user profiles in dependence upon a degree of match between one or more properties of the transmitted telemetry data and the data of each respective user profile, and configured to modify an output of the system responsive to the selection, wherein the controller comprises an electric motor configured to generate a force for providing a haptic signal to the user of the controller, and the user profile selection unit is configured to select the user profile from the one or more user profiles in dependence upon one or more of the properties of the telemetry data transmitted by the transmitter within a predetermined period of time following the provision of the haptic signal to the user of the controller.

2. The system according to claim 1, wherein the user profile selection unit is configured to calculate a confidence score for each of the one or more user profiles, the confidence score indicative of the degree of match between one or more of the properties of the transmitted telemetry data and the data of each respective user profile.

3. The system according to claim 2, wherein the user profile selection unit is configured to select the user profile from the one or more user profiles by determining whether the confidence score for a given user profile satisfies a predetermined threshold condition.

4. The system according to claim 1, wherein in response to the modification of the output of the system the user profile selection unit is configured to either request the user to confirm the selection of the user profile or automatically permit access to the selected user profile.

5. The system according to claim 1, wherein the one or more properties of the transmitted telemetry data and the telemetry data of each respective user profile comprise one or more of:
   a maximum velocity of the controller;
   a minimum velocity of the controller;
   a mean velocity of the controller;
   a median velocity of the controller;
   a standard deviation of the velocity of the controller;
   a variance of the velocity of the controller;
   a range of the velocity of the controller;
   a mean position of the controller;
   a mean orientation of the controller;
   a vertical height difference between the mean position of the controller and an initial resting position of the controller; and
   a mean period of time for which a given pressure sensitive switch of the controller has a closed configuration when operated by the user.

6. The system according to claim 1, wherein the transmitted telemetry data and the data of each respective user profile comprises position data and orientation data, and for at least one of the position data and the orientation data the one or more properties of the transmitted telemetry data and the data of each respective user profile comprise one or more properties of:
   a minimum;
   a maximum;
   a mean;
   a $10^{th}$ percentile;
   a $20^{th}$ percentile;
   a $30^{th}$ percentile;
   a $40^{th}$ percentile;
   a median;
   a $60^{th}$ percentile;
   a $70^{th}$ percentile;
   an $80^{th}$ percentile;
   a $90^{th}$ percentile;
   a variance;
   a standard deviation;
   a standard error of the mean;
   an interquartile range;
   a coefficient of variation;
   a mean absolute deviation; and
   a range.

7. The system according to claim 1, wherein the one or more sensors comprise at least one of a gyroscope, an accelerometer, a magnetometer and a pressure sensitive switch.

8. The system according to claim 1, wherein the telemetry data comprises one or more from the list consisting of:
   controller position data;
   controller orientation data;
   controller motion data; and
   data indicative of a configuration of one or more pressure sensitive switches of the controller.

9. The system according to claim 1, wherein the transmitter is configured to periodically transmit the telemetry data and the user profile selection unit is configured to periodically select the user profile from the one or more user profiles in dependence upon a periodic analysis of the degree of match between the transmitted telemetry data and the data of each respective user profile.

10. The system according to claim 1, wherein the user profile selection unit is configured to input the transmitted telemetry data and the data of each respective user profile to a model, and wherein the model is trained to determine one or more of the properties of the transmitted telemetry data and to compare one or more of the properties of the transmitted telemetry data with one or more corresponding properties of the data of each respective user profile to determine the degree of match between the transmitted telemetry data and the data of each respective user profile.

11. The system according to claim 1, comprising:
   a user profile analysis unit configured to determine, for the data indicative of one or more characteristic interactions by each user with the controller, a plurality of properties for each respective user profile; and
   a correlation unit configured to select one or more properties from the plurality of properties to produce a set of properties for each user profile, wherein each set of properties uniquely identifies the corresponding user profile with respect to the plurality of user profiles, wherein the correlation unit is configured to store the model defining a set of properties for each user profile, each set of properties comprising one or more properties each having an associated value.

12. A method of identifying a user of a controller, comprising:
   detecting, by one or more sensors of a controller, interaction with the controller by the user;
   transmitting telemetry data based on outputs of one or more of the sensors;
   obtaining user profile data for one or more user profiles, wherein each user profile corresponds to a respective user and the user profile data for a user profile comprises data characteristic of an interaction by the user with the controller;
   selecting a user profile from the one or more user profiles in dependence upon a degree of match between one or more properties of the transmitted telemetry data and the data of each respective user profile; and
   modifying an output responsive to the selection,
   wherein the controller comprises an electric motor configured to generate a force for providing a haptic signal to the user of the controller, and the selecting includes selecting the user profile from the one or more user profiles in dependence upon one or more of the properties of the telemetry data transmitted by the transmitter within a predetermined period of time following the provision of the haptic signal to the user of the controller.

13. The method according to claim 12, comprising:
obtaining user profile data for a plurality of user profiles, wherein each user profile corresponds to a respective user and the user profile data for a user profile comprises data indicative of one or more characteristic interactions by the user with the controller;
determining for the data indicative of one or more characteristic interactions by each user with the controller, a plurality of properties for each respective user profile;
selecting one or more properties from the plurality of properties to produce a set of properties for each user profile, wherein each set of properties uniquely identifies the corresponding user profile with respect to the plurality of user profiles; and
storing a model defining a set of properties for each user profile, each set of properties comprising one or more properties each having an associated value.

14. A non-transitory, computer-readable storage medium containing computer software which, when executed by a computer, causes the computer to identify a user of a controller, by carrying out actions, comprising:
detecting, by one or more sensors of a controller, interaction with the controller by the user;
transmitting telemetry data based on outputs of one or more of the sensors;
obtaining user profile data for one or more user profiles, wherein each user profile corresponds to a respective user and the user profile data for a user profile comprises data characteristic of an interaction by the user with the controller;
selecting a user profile from the one or more user profiles in dependence upon a degree of match between one or more properties of the transmitted telemetry data and the data of each respective user profile; and
modifying an output responsive to the selection,
wherein the controller comprises an electric motor configured to generate a force for providing a haptic signal to the user of the controller, and the selecting includes selecting the user profile from the one or more user profiles in dependence upon one or more of the properties of the telemetry data transmitted by the transmitter within a predetermined period of time following the provision of the haptic signal to the user of the controller.

* * * * *